Figure 9:
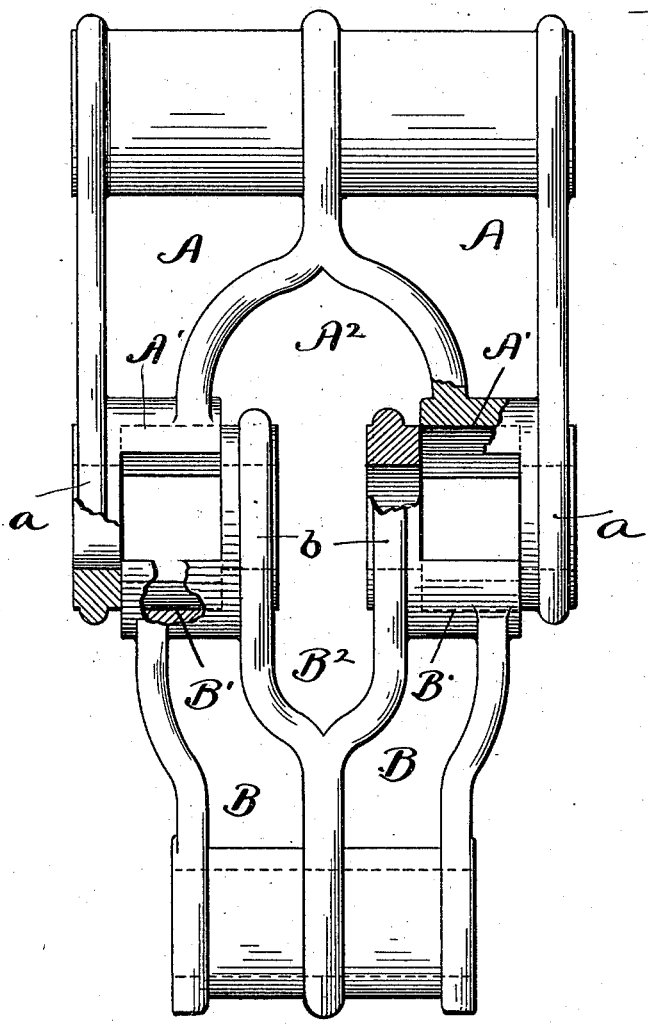

(No Model.) 2 Sheets—Sheet 1.
W. W. WALLACE.
JOINT FOR TOGGLE ARMS.
No. 513,544. Patented Jan. 30, 1894.
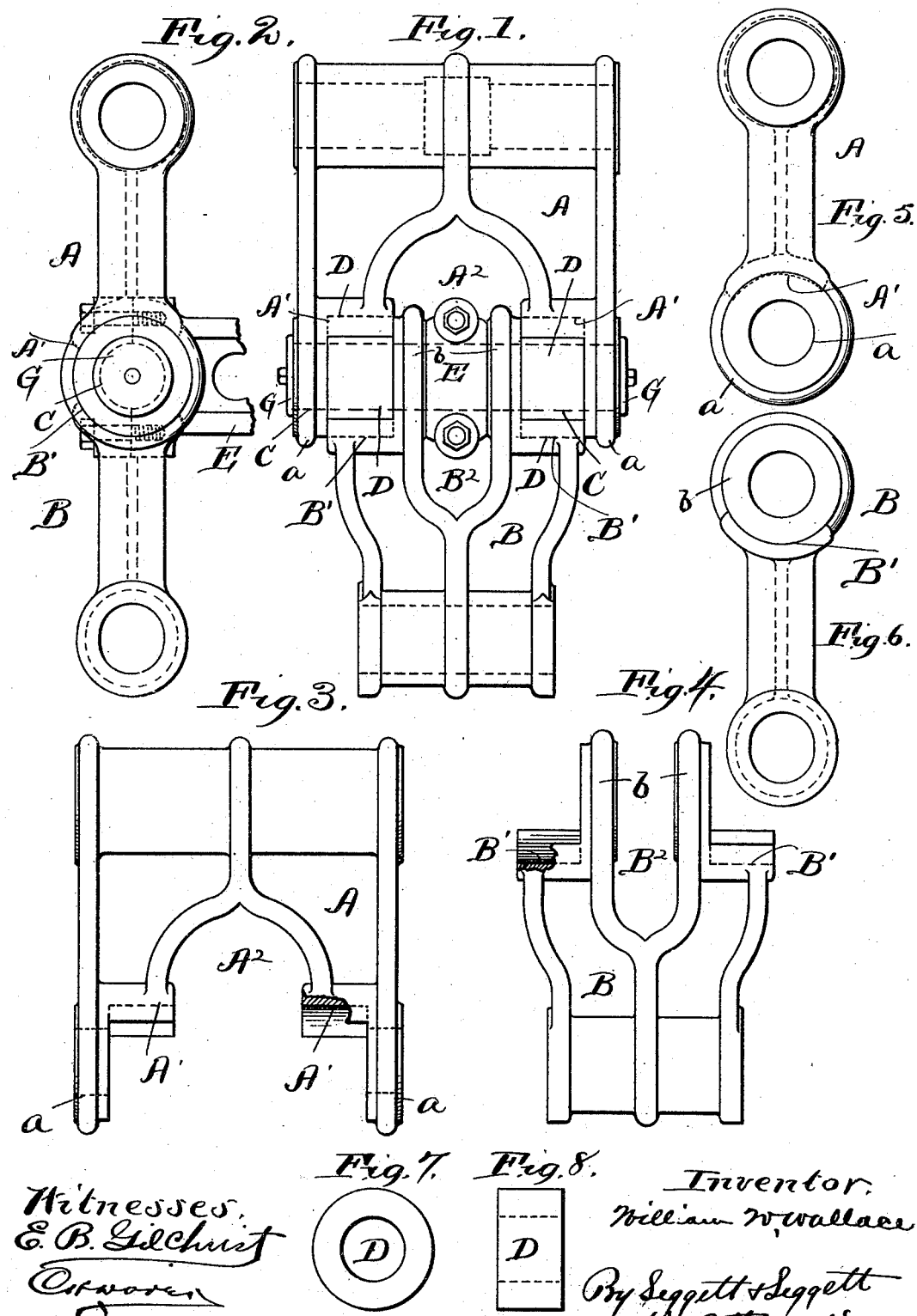
Witnesses
E. B. Gilchrist
Osworen
Inventor
William W. Wallace
By Leggett & Leggett
his Attorneys (No Model.) 2 Sheets—Sheet 2.

W. W. WALLACE.
JOINT FOR TOGGLE ARMS.

No. 513,544. Patented Jan. 30, 1894.

Witnesses.
E. B. Gilchrist

Inventor.
William W. Wallace.
By Leggett & Leggett
his Attorneys.

UNITED STATES PATENT OFFICE.

WILLIAM W. WALLACE, OF WILLOUGHBY, OHIO, ASSIGNOR TO J. W. PENFIELD & SON, OF SAME PLACE.

JOINT FOR TOGGLE-ARMS.

SPECIFICATION forming part of Letters Patent No. 513,514, dated January 30, 1894.

Application filed September 25, 1893. Serial No. 486,425. (No model.)

*To all whom it may concern:*

Be it known that I, WILLIAM W. WALLACE, of Willoughby, in the county of Lake and State of Ohio, have invented certain new and useful Improvements in Joints for Toggle-Arms; and I do hereby declare the following to be a full, clear, and exact description of the invention, such as will enable others skilled in the art to which it pertains to make and use the same.

My invention relates to improvements in joints for toggle-arms, more especially designed for use in presses wherein great pressure is required.

The common practice, heretofore, of connecting toggle-arms has been by having the one toggle-arm embrace the other toggle-arm with the axial pin of the toggle-arm joint extending through the embraced arm. Such construction was objectionable in that the toggle-arms would soon wear away at the joint, owing to the excessive friction between the parts.

To avoid the objectionable feature just referred to, I have devised the joint for toggle-arms illustrated in the accompanying drawings, wherein—

Figure 1 is an elevation of the two toggle-arms joined together, showing also the manner of connecting a link, for actuating the toggle-arms, with the joint of the toggle-arms. Fig. 2 is a right hand side elevation relative to Fig. 1. Figs. 3 and 4 are elevations of the two toggle-arms respectively, and Figs. 5 and 6 are right hand side elevations relative to Figs. 3 and 4, respectively. Figs. 7 and 8 are side and end elevations, respectively, of one of the rings or sleeves that receive the wear during the operation of the toggle-arms. Fig. 9 is a side elevation of the two toggle-arms in position with the axial pin removed, looking at the side opposite to that shown in Fig. 1. Portions are broken away in Figs. 3 and 4 to more clearly show the construction.

Referring to the drawings, A and B represent the toggle-arms, respectively. The body of one toggle-arm,—the upper arm A, in the present instance,—at its inner end, terminates in two perforated preferably ring-shaped ears, members or extremities, $a$, that are located at opposite sides of the toggle-arm, respectively, the bore $a'$ through said ears or perforated extremities of the toggle-arm referred to, being just large enough to nicely but easily receive the axial pin, C, of the joint of the toggle-arms. Upon said axial pin, and abutting the inner side of the aforesaid ears or perforated extremities of said toggle-arm, are mounted rings or sleeves D, portions whereof (in the present instance the upper portions thereof) engage corresponding recesses or depressions $A'$ in the body of the toggle-arm, the latter being centrally slotted or cut away at its inner end between the recessed portions aforesaid, as at $A^2$, to accommodate the location of the inwardly-projecting preferably annular-shaped ears or perforated members or extremities $b$ of the inner or adjacent end of the other or lower toggle-arm, B. Said ears or perforated extremities $b$ of arm B preferably engage the inner ends of the aforesaid recessed portions of toggle-arm A, and are located a suitable interval apart, and embrace the axial pin at or near the central portion of the pin. The body of the toggle-arm B is centrally slotted or cut away between said ears or extremities, as at $B^2$, if need be, to accommodate the location and operation of the operating-link or member E that is shown, in Figs. 1 and 2, suitably embracing the axial pin of the joint of the toggle-arm between extremities $b$ of arm B. Rings or sleeves D at a point opposite or approximately opposite to the point at which the same are engaged by the body portion of the toggle-arm A, engage corresponding recesses or depressions $B'$ in the body portion of toggle-arm B, and said recessed portions of toggle-arm B easily engage the inner sides of the ears or perforated extremities $a$ of toggle-arm A. To accommodate the assemblage of rings or sleeves D the recesses or depressions $a$ in toggle-arm A are open at their inner ends, and the similar recesses or depressions $b$ in toggle-arm B are open at their outer ends.

The toggle-arms are, of course, perforated at their outer end for the reception of the pivotal pin (not shown) upon which the arms are adapted to swing.

The parts of the toggle-arm joint having been assembled in the manner hereinbefore described, they are securely fastened together in any suitable manner, for instance, by means of cap-plates G secured to the outer ends of the axial pin of the joint and overlapping the adjacent side of the contiguous toggle-arms.

By the construction hereinbefore described, it will be observed that simplicity and durability are obtained; that the wear is upon rings or sleeves D, and that these rings or sleeves, when worn too much, can be readily removed and new ones substituted at a small cost.

What I claim is—

1. In a joint for toggle-arms, the combination, with the axial pin, of the toggle-arms, the one toggle-arm embracing the outer ends of the pin, and the other toggle-arm embracing the pin at or near the central portion of the same, and rings or sleeves on the pin between the pin-embracing-portions of the two toggle-arms, the toggle-arms partially embracing said rings or sleeves, substantially as and for the purpose set forth.

2. In a joint for toggle-arms, the combination, with the axial pin, of the toggle-arms, the one toggle-arm terminating at its inner end in ears that embrace the outer ends of said pin, and the other toggle-arm terminating at its inner end in ears that are located a suitable distance apart and embrace the axial pin at or near the central portion of the same, and rings or sleeves mounted upon said pin between the ears of the toggle arms, and the body portions of the toggle-arms partially embracing said rings or sleeves, substantially as and for the purpose set forth.

3. In a joint for toggle-arms, the combination, with the axial-pin, of the toggle-arms A and B, the one toggle-arm A terminating at its inner end in ears $a$ that embrace the outer ends of the axial pin, and the other toggle-arm terminating at its inner end in ears $b$ located a suitable interval apart and embracing the axial pin a suitable distance inside of the aforesaid pin embracing ears of toggle-arm A, and rings or sleeves mounted upon the axial pin between the ears of toggle-arm B and the ears of toggle-arm A, the body portion of toggle-arm A having recessed or grooved portions at the inner side of its pin-embracing ears with the grooves or recesses open at their inner ends, and the body portion of toggle-arm B being recessed or grooved at the outer side of its pin-embracing ears, with the grooves or recesses open at their outer ends, the pin-embracing ears of toggle-arm B engaging the inner ends of the aforesaid recessed portions of the body of the toggle-arm A, and the aforesaid rings or sleeves engaging the grooves or recesses in the aforesaid recessed portions of the toggle-arms, substantially as set forth.

4. The combination, with the joint of toggle-arms, the same consisting of the axial pin, ears on the one toggle-arm embracing the outer ends of said pin, ears on the other toggle-arm located a suitable interval apart and embracing the axial pin a suitable distance from its outer ends, and rings or sleeves mounted upon said pin between the pin-embracing-ears of the one toggle-arm and the pin-embracing-ears of the other toggle-arm, said rings or sleeves engaging grooves or recesses in the respective toggle-arms, of the link or member for operating the toggle-arms, said operating member being operatively connected with the central portion of the axial pin between the pin-embracing-ears of the one toggle-arm, subtantially as set forth.

In testimony whereof I sign this specification, in the presence of two witnesses, this 2d day of September, 1893.

WILLIAM W. WALLACE.

Witnesses:
   C. H. DORER,
   WARD HOOVER.